(12) United States Patent
Hayashi et al.

(10) Patent No.: US 6,395,809 B1
(45) Date of Patent: May 28, 2002

(54) NIGROSINE COMPOUND, RESIN COMPOSITION, MOLDED PRODUCT, CRYSTALLIZATION TEMPERATURE LOWERING, FLUIDITY IMPROVING AND SURFACE GLOSS IMPROVING METHOD

(75) Inventors: Akihiko Hayashi; Tohru Turuhara, both of Osaka (JP)

(73) Assignee: Orient Chemical Industries, Ltd. (JP)

( * ) Notice: Subject to any disclaimer, the term of this patent is extended or adjusted under 35 U.S.C. 154(b) by 0 days.

(21) Appl. No.: 09/605,060

(22) Filed: Jun. 28, 2000

(30) Foreign Application Priority Data

Jun. 30, 1999 (JP) ............................ 11-186613

(51) Int. Cl.[7] ...................... C08K 5/3465; C08K 5/521; C08K 5/41
(52) U.S. Cl. ......................... 524/89; 524/127; 524/156; 524/157; 524/284; 544/347; 544/348
(58) Field of Search .................... 544/347, 348; 524/89, 127, 156, 157, 284

(56) References Cited

U.S. PATENT DOCUMENTS 5,827,911 A * 10/1998 Hayashi et al. .............. 524/89

FOREIGN PATENT DOCUMENTS

| JP | 60-226551 | 4/1985 |
| JP | 60-43379 | 9/1985 |
| JP | 62-246958 | 1/1987 |
| JP | 1-46524 | 2/1989 |
| JP | 2-117951 | 5/1990 |
| JP | 3-50263 | 3/1991 |
| JP | 5-186633 | 7/1993 |
| JP | 5-194825 | 8/1993 |
| JP | 5-230278 | 9/1993 |
| JP | 128479 | 5/1994 |
| JP | 8-53610 | 2/1996 |

* cited by examiner

*Primary Examiner*—Kriellion A. Sanders
(74) *Attorney, Agent, or Firm*—McGlew and Tuttle, P.C.

(57) ABSTRACT

Water-insoluble nigrosine compound which is a salt of nigrosine with sulfuric acid and/or phosphoric acid, crystalline resin composition containing the nigrosine compound, and fiber-reinforced crystalline resin molded product comprising a crystalline resin and a fibrous reinforcing material and the nigrosine compound both contained therein, wherein the surface gloss is higher than that of the fiber-reinforced crystalline resin molded product with nigrosine as a substitute for said nigrosine compound.

Methods for lowering the crystallization temperature of a crystalline resin, improving the fluidity of a crystalline resin, and improving the surface gloss of a crystalline resin, by incorporating the water-insoluble nigrosine in the crystalline resin respectively.

46 Claims, 2 Drawing Sheets

NIGROSINE COMPOUND, RESIN COMPOSITION, MOLDED PRODUCT, CRYSTALLIZATION TEMPERATURE LOWERING, FLUIDITY IMPROVING AND SURFACE GLOSS IMPROVING METHOD

BACKGROUND OF THE INVENTION

1. Field of the Invention

The present invention relates to a water-insoluble nigrosine compound, a crystalline resin composition and fiber-reinforced crystalline resin molded product both containing said nigrosine compound, a method for lowering the crystallization temperature of a crystalline resin, a method for improving the to fluidity of a crystalline resin, and a method for improving the surface gloss of a crystalline resin.

2. Description of the Prior Art

Being excellent in mechanical and chemical properties, crystalline resins are widely used for molded plastic products in the field of parts of automobiles, electric and electronic products, etc, and their demand is increasing in the field of engineering plastics.

Crystalline resins are colored for decoration, color identification, improvement of light fastness of molded products, content protection and shading and for other purposes. Traditionally, various inorganic pigments and organic dyes/pigments, such as carbon black, black metal complex dyes, azine dyes and perinone black, have been used for black coloring of crystalline resins.

More specifically, examples of colored crystalline resins include a molding formula comprising a polyamide resin colored with carbon black and nigrosine (Japanese Patent Examined Publication No. 43379/1985); a molding composition comprising a polyamide resin colored with carbon black and a copper phthalocyanine pigment (Japanese Patent Unexamined Publication No. 226551/1985); a molding composition comprising an unsaturated polyester resin colored with aniline black and solvent blue (Japanese Patent Examined Publication No. 46524/1989); a plastic molding composition comprising a thermoplastic resin added with carbon black and titanium oxide (Japanese Patent Unexamined Publication No. 186633/1993); a colored resin composition comprising a thermoplastic resin colored with a red organic pigment, a blue organic pigment and a yellow organic pigment (Japanese Patent Unexamined Publication No. 230278/1993); and a mixed resin of polyethylene terephthalate resin and polybutylene terephthalate resin with carbon black dispersed therein (Japanese Patent Unexamined Publication No. 194825/1993).

However, these conventional colored crystalline resin compositions do not always have good appearance and surface gloss, remaining to require further investigation.

In addition, there have been attempts to improve the heat resistance and chemical resistance of crystalline resins or to confer mechanical characteristics suited for various uses, by formulating a fibrous reinforcing material therein, to meet the requirements of a wide variety of industrial applications. Furthermore, in recent years, there has been a marked trend toward replacement of conventional metal parts of products with fiber-reinforced crystalline resin parts, for the purpose of weight reduction, manufacturing process simplification and corrosion prevention, taking note of the good properties of fiber-reinforced crystalline resins as molding materials.

Examples of such fiber-reinforced colored crystalline resins include the polyamide vehicle element described in Japanese Patent Unexamined Publication No. 246958/1987, which comprises a nylon 66/6 copolymer, glass fiber, an inorganic mineral powder and an azine dye; a polyester resin composition for molding comprising a polybutylene terephthalate having a specific viscosity of not less than 0.35, a reinforcing material and carbon black (Japanese Patent Unexamined Publication No. 117951/1990); a thermoplastic resin composition comprising a thermoplastic resin, a modified polyolefin, a fibrous reinforcing material and carbon black (Japanese Patent Unexamined Publication No. 50263/1991); a glass fiber-reinforced black polyamide resin composition comprising a polyamide resin, surface-treated glass fiber and an azine dye (Japanese Patent Unexamined Publication No. 128479/1994); and a polybutylene terephthalate resin composition reinforced with antistatic fiber comprising a glass fiber-reinforced polybutylene terephthalate resin having a volume specific resistivity of not more than $1 \times 10^{10}$ $\Omega \cdot$ cm and carbon black (Japanese Patent Unexamined Publication No. 53610/1996).

However, in coloring a fiber-reinforced crystalline resin, there arises the problem of difficulty in thoroughly and uniformly dispersing a coloring agent (e.g., black pigment) in the resin even by kneading for a long time, because of the presence of a fibrous reinforcing material in the resin. In addition, adding a coloring agent can deteriorate the physical properties in comparison with the original resin before its addition, can considerably reduce the fluidity during molding, and can intensify the warpage deformation of the molded product due to a temperature change during molding. In particular, the flotation of the fibrous reinforcing material on the surface of the molded product poses the problem of deterioration of the gloss, appearance, etc. of the colored molded product.

The present invention was developed in view of the above problems in the prior art. Accordingly, the object of the invention is to provide a nigrosine compound which is capable of vividly coloring a crystalline resin (fiber-reinforced or not), which shows particularly good fluidity during molding of a colored crystalline resin, which is excellent in molding precision for the colored crystalline resin, and which favorably improves the appearance-related properties, such as surface gloss, and surface shape or texture, of the molded product, a crystalline resin composition and fiber-reinforced crystalline resin molded product containing said nigrosine compound, a method for lowering the crystallization temperature of a crystalline resin, a method for improving the fluidity of a crystalline resin, and a method for improving the surface gloss of a crystalline resin.

SUMMARY OF THE INVENTION (1) The nigrosine compound of the present invention for accomplishing the above object is a water-insoluble nigrosine compound which is a salt of nigrosine with sulfuric acid and/or phosphoric acid.

The term "salt of nigrosine with sulfuric acid and/or phosphoric acid" as used herein refers to a salt of nigrosine (generally hydrochloride) wherein sulfate ions and/or phosphate ions are bound to all or a considerable portion (e.g., not less than 50%, or not less than 70%, and preferably not less than 90%) of the groups capable of binding sulfate ions or phosphate ions. (1-1) The nigrosine compound of Term (1) desirably has a chlorine concentration (i.e., chlorine concentration in nigrosine compound) of not more than 3% by weight.

(1-2) In addition, the nigrosine compound of Term (1) or (1-1) desirably has an iron concentration (i.e., iron concentration in nigrosine compound) of not more than 0.5% by weight.

(1-3) In addition, the nigrosine compound of Term (1), (1-1) or (1-2) desirably has a residual aniline concentration (i.e., residual aniline concentration in nigrosine compound) of not more than 0.5% by weight.

(1-4) In addition, the nigrosine compound of Term (1), (1-1), (1-2) or (1-3) desirably has a volume resistivity value of not less than $2.0 \times 10^{10}$ Ω· cm.

(1-5) The nigrosine compound of Term (1), (1-1), (1-2), (1-3) or (1-4) can, for example, be produced by treating nigrosine (generally hydrochloride) with sulfuric acid and/or phosphoric acid. When the nigrosine is a hydrochloride, the treatment of the nigrosine with sulfuric acid and/or phosphoric acid may be such that the chlorine ion constituting the salt in the nigrosine is exchanged with a sulfate ion and/or phosphate ion.

(1-6) Furthermore, the nigrosine compound of Term (1), (1-1), (1-2), (1-3) or (1-4) is desirably a sulfate of nigrosine having a chlorine concentration of not more than 9000 ppm.

(2) The crystalline resin composition of the present invention is characterized in that the nigrosine compound of Term (1), (1-1), (1-2), (1-3), (1-4), (1-5) or (1-6) is contained in a crystalline resin.

(2-1) The crystalline resin in the crystalline resin composition of Term (2) is preferably polyamide resin, polyethylene terephthalate resin, polybutylene terephthalate resin or polyphenylene sulfide resin.

(2-2) The crystalline resin composition of Term (2) or (2-1) may have a crystallization temperature lower by not less than 70C than that of the original thermoplastic resin containing no nigrosine compound.

(2-3) The crystalline resin composition of Term (2), (2-1) or (2-2) may contain a fibrous reinforcing material.

(2-4) The crystalline resin composition of Term (2-3) is preferably higher in fluidity than the crystalline resin composition with nigrosine (original nigrosine, generally hydrochloride) as a substitute for the nigrosine compound contained therein. For example, the crystalline resin composition of Term (2-3) preferably has a spiral flow length longer by not less than 10%, more preferably not less than 15%, and still more preferably not less than 20%, under conditions corresponding to the ordinary molding conditions for a crystalline resin composition containing a fibrous reinforcing material.

(2-5) The crystalline resin composition of Term (2), (2-1), (2-2), (2-3) or (2-4) may contain aniline black.

(2-6) The crystalline resin composition of Term (2), (2-1), (2-2), (2-3), (2-4) or (2-5) may contain carbon black.

(3) The fiber-reinforced crystalline resin molded product of the present invention comprises a fibrous reinforcing material and the nigrosine compound of Term (1), (1-1), (1-2), (1-3), (1-4), (1-5) or (1-6) contained resin, wherein the surface gloss is higher than that of the fiber-reinforced crystalline resin molded product with nigrosine as a substitute for said nigrosine compound.

The fiber-reinforced crystalline resin molded product of the present invention preferably higher by not less than 10% than the fiber-reinforced crystalline resin molded product containing nigrosine as a substitute for the nigrosine compound, in terms of gloss value as determined at an incidence angle of 60 degrees with respect to the test piece, using a glossmeter [produced by Suga Test Instruments, trade name: HG-268], for example.

(4) The method of the present invention for lowering the crystallization temperature of a crystalline resin is characterized in that the crystallization temperature of the crystalline resin is lowered by not less than 7° C. from that of the original thermoplastic resin containing no nigrosine compound by containing the nigrosine compound of Term (1), (1-1), (1-2), (1-3), (1-4), (1-5) or (1-6) in the crystalline resin.

(5) The method of the present invention for improving the fluidity of a crystalline resin is characterized in that the fluidity of the crystalline resin is improved in comparison with that of the original thermoplastic resin containing no nigrosine compound by containing the nigrosine compound of Term (1), (1-1), (1-2), (1-3), (1-4), (1-5) or (1-6) in the crystalline resin.

This method for improving the fluidity of a crystalline resin may be such that a fibrous reinforcing material is contained in the crystalline resin.

(6) The method of the present invention for improving the surface gloss of a crystalline resin is characterized in that the surface gloss of the crystalline resin is improved in comparison with that of the original thermoplastic resin containing no nigrosine compound by containing the nigrosine compound of Term (1), (1-1), (1-2), (1-3), (1-4), (1-5) or (1) in the crystalline resin.

(6-1) The method of Term (6) for improving the surface gloss of a crystalline resin may be such that a fibrous reinforcing material is contained in the crystalline resin.

(7) A crystalline resin formulated with the nigrosine compound of the present invention is highly fluid while in a thermally molten state during molding, well spreads through all portions of the mold, and shows excellent dimensional stability during heating, thus enabling smooth molding treatment. For this reason, fine ruggedness is unlikely to occur in the surface of the molded product and the molding precision is good. This is quite advantageous in molding using large-sized molding machines, molding for precision molded products, and molding products undergoing rigorous requirements of dimensional precision. In addition, this is conspicuous in the case of crystalline resin compositions containing a fibrous reinforcing material, in which coloring agents and additives are considerably difficult to disperse, and the fluidity is reduced, because of the influence of the fibrous reinforcing material.

A crystalline resin formulated with the nigrosine compound of the present invention has a crystallization temperature lower that that of the original crystalline resin not containing said nigrosine compound. On the basis of this crystallization temperature reduction, the molding temperature for a crystalline resin composition can be set at low levels. For this reason, it is easily possible to reduce molding cost and suppress molding failure. In addition, because the shrinkage of the molded product upon cooling during molding is decreased, the molding precision improves so that the anisotropy of molded product strength can be well reduced, and a molded product with excellent surface gloss, appearance and dimensional stability during heating can be obtained. Regarding the obtainment of a molded product with excellent surface gloss and appearance, this effect is remarkable in the case of crystalline resin compositions containing a fibrous reinforcing material, which tend to have the fibrous reinforcing material floating on the surface of the molded product. Furthermore, as the crystallization temperature lowers, the allowance for adjustment of metal mold temperature and injection time in injection molding broadens so that the crystallization temperature of the molded product can be easily adjusted over a desired range. By optimally setting the metal mold temperature and injection time, the surface gloss of a molded product can be improved.

When the nigrosine compound of the present invention is formulated in a crystalline resin to color the crystalline resin, a uniformly and brilliantly colored molded product having a higher OD value than that obtained with conventional nigrosine (hydrochloride), and excellent surface gloss, is obtained; this effect is remarkable in the case of crystalline resins containing a fibrous reinforcing material, in which the fibrous reinforcing material is likely to float on the surface. Furthermore, the nigrosine compound of the present invention causes minimal fading and discoloration in the crystalline resin during pellet drying, formulation, kneading and molding before extrusion molding.

The nigrosine compound of the present invention surpasses nigrosine (hydrochloride) and black pigments which have traditionally been used for coloring crystalline resins in terms of dispersibility and/or compatibility for crystalline resins. With this feature, the nigrosine compound of the present invention is capable of more uniformly black coloring a crystalline resin with good appearance and surface shape or texture even when the dry color method is used. This uniform coloring effect is particularly remarkable in the case of coloring crystalline resins containing a fibrous reinforcing material, in which coloring agents are difficult to disperse due to the influence of the fibrous reinforcing material. Using in combination with carbon black, an inexpensive material of high light fastness, the nigrosine compound of the present invention makes it possible to achieve cost reduction and improved light fastness.

In addition, when the nigrosine compound of the present invention is formulated in a crystalline resin to color the crystalline resin, the solvent resistance is improved in comparison with conventional nigrosine (hydrochloride).

The nigrosine compound of the present invention is capable of brilliantly coloring a crystalline resin (fiber-reinforced or not).

The crystalline resin of the present invention, which is formulated with the nigrosine compound of the present invention, shows good fluidity while in a molten state during molding.

In addition, because the nigrosine compound of the present invention permits significant reduction in the contents of impurities likely to vaporize upon hot melting during molding and those reactive to crystalline resins, in comparison with conventional nigrosine (hydrochloride), crystalline resins formulated with the nigrosine compound of the present invention have effectively suppressed weight loss and gas generation during molding, and undergo minimal changes in the physical properties thereof. With these features, crystalline resins formulated with the nigrosine compound of the present invention are excellent in molding precision, and produce molded products having appearance-related properties, such as surface gloss, and surface shape or texture, improved well. The fiber-reinforced crystalline resin molded product of the present invention, in particular, has a good surface gloss.

According to the method of the present invention for lowering the crystallization temperature of a crystalline resin, the crystallization temperature of a crystalline resin composition can be lowered in comparison with that of the original thermoplastic resin containing no nigrosine compound.

According to the method of the present invention for improving the fluidity of a crystalline resin, the fluidity of a crystalline resin, including those containing a fibrous reinforcing material, can be improved in comparison with that of the original thermoplastic resin containing no nigrosine compound.

According to the method of the present invention for improving the surface gloss of a crystalline resin, the surface gloss of a crystalline resin, including those containing a fibrous reinforcing material, can be improved in comparison with the original thermoplastic resin containing no nigrosine compound.

DETAILED DESCRIPTION OF THE INVENTION

Figure 1:
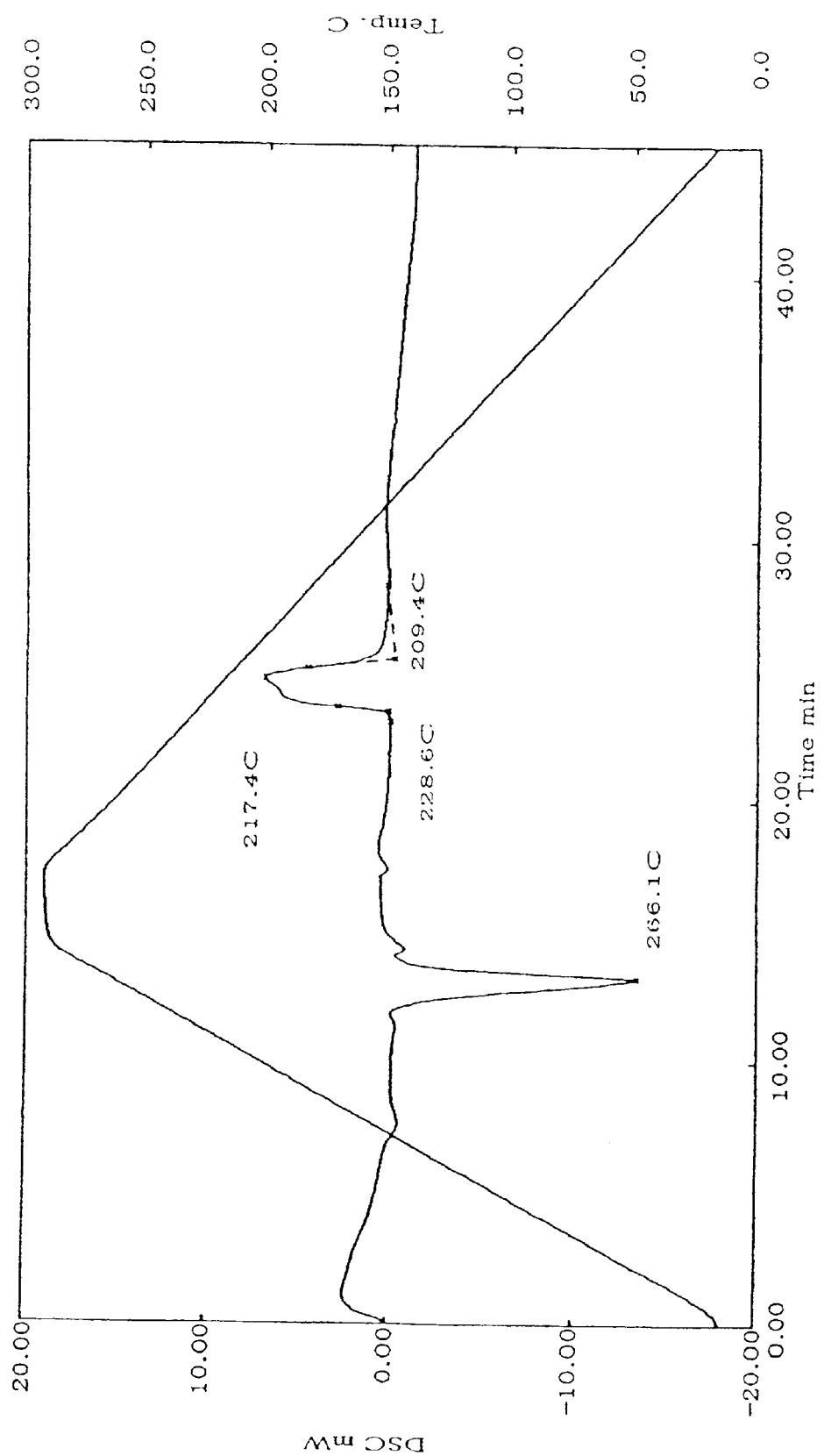
FIG. 1 shows a DSC curve for colored pellets.

The description below applies to both crystalline resins with a fibrous reinforcing material contained therein and those without, except in cases where the two are distinguished from each other.

The water-insoluble nigrosine compound of the present invention can be obtained by treating nigrosine with sulfuric acid and/or phosphoric acid.

Said nigrosine, i.e., a nigrosine which can be used as a starting material for the nigrosine compound of the present invention, is exemplified by black azine condensed mixtures like those described in the COLOR INDEX as C.I. SOLVENT BLACK 5 or C.I. SOLVENT BLACK 7. Preference is given to C.I. SOLVENT BLACK 5. Synthesis of such nigrosine can, for example, be achieved by oxidizing and dehydrate-condensing aniline, aniline hydrochloride and nitrobenzene in the presence of iron chloride at a reaction temperature of 160 to 180° C. Nigrosine is produced as a mixture of various different compounds, depending on reaction conditions, charged materials and charging ratio, and is assumed to be a mixture of various triphenazineoxazines of Formula or (II) below and phenazineazine compounds of Formulas (III) through (VI).

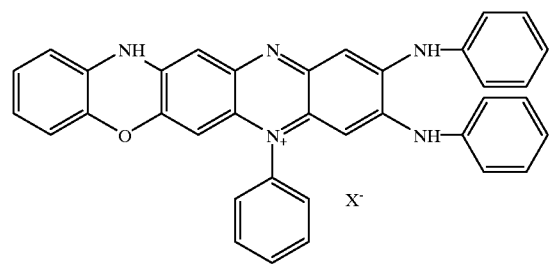

[II]

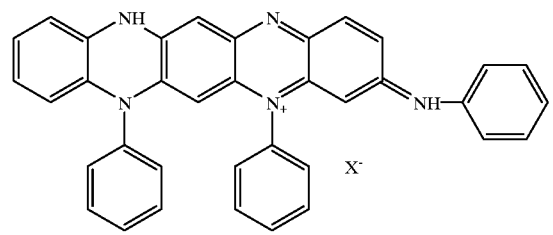

[III]

-continued

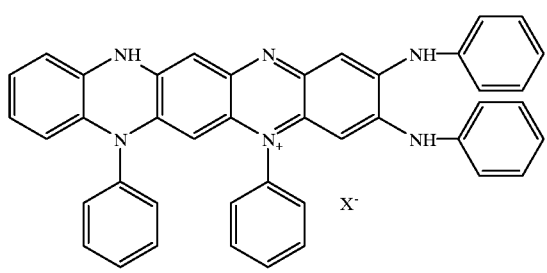

[IV]

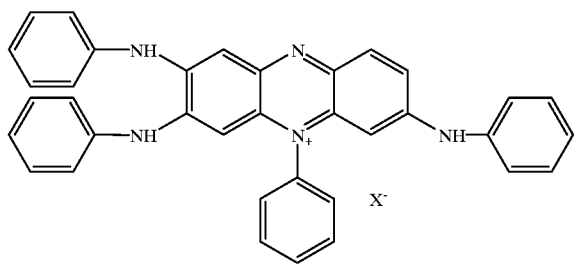

[V]

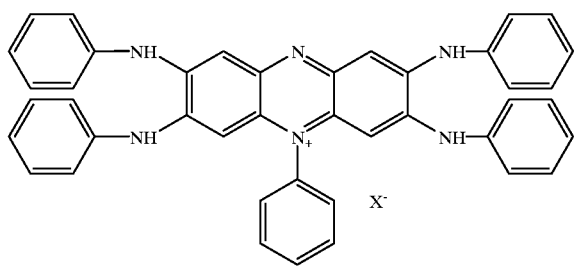

[VI]

[In Formulas (II) through (VI), X represents Cl or OH.]

When the nigrosine is a hydrochloride, its treatment with sulfuric acid and/or phosphoric acid can be achieved by any commonly known reaction method, as long as all or a considerable portion of the chlorine ions constituting the salt in the nigrosine are exchanged with sulfate ions and/or phosphate ions. In the case of treatment with sulfuric acid, however, aromatic nucleus substitution (sulfonation) in the nigrosine is exempted.

Specifically, the water-insoluble nigrosine compound of the present invention can, for example, be produced by dispersing nigrosine in dilute sulfuric acid, and appropriately heating (e.g., 50 to 90° C.) it. It can, for example, also be produced by dispersing the condensation reaction liquid resulting from the production of nigrosine in dilute sulfuric acid, and appropriately heating (e.g., 50 to 90° C.) it. In addition, it can, for example, also be produced by dissolving nigrosine in concentrated sulfuric acid while the liquid temperature is kept low to prevent sulfonation, and adding this solution to a large amount of ice water to precipitate a crystal.

The chlorine concentration in the nigrosine compound of the present invention is preferably not more than 3% by weight, with greater preference for improvement of the surface shape or texture and electric insulation of the molded product as contained in a crystalline resin composition given to a nigrosine compound having a chlorine concentration of not more than 2% by weight.

When the nigrosine compound of the present invention is a sulfate of nigrosine, its chlorine concentration is desirably not more than 9000 ppm, more preferably not more than 8000 ppm.

The iron concentration in the nigrosine compound of the present invention may, for example, be not more than 0.7% by weight. To further improve its electric insulation when it is contained in a crystalline resin composition, the nigrosine compound preferably has an iron concentration of not more than 0.5% by weight, more preferably not more than 0.4% by weight.

The residual aniline concentration in the nigrosine compound of the present invention may, for example, be not more than 1% by weight. For improvement of the surface shape or texture of the molded product as contained in a crystalline resin composition, greater preference is given to a nigrosine compound having a residual aniline concentration of not more than 0.5% by weight, still more preferably not more than 0.4% by weight.

The nigrosine compound of the present invention has improved electric insulation because impurities are removed from nigrosine through the process in which nigrosine is treated with sulfuric acid and/or phosphoric acid, to convert it to a salt with sulfuric acid and/or phosphoric acid. For this reason, the nigrosine compound of the present invention is suited for use as a material for articles for which electric insulation is a key factor, such as electronic components and electrical parts.

The volume resistivity value of the nigrosine compound of the present invention is preferably not less than $2.0 \times 10^{10}$ $\Omega \cdot$ cm, more preferably not less than $2.5 \times 10^{10}$ $\Omega \cdot$ cm, and still more preferably not less than $3.0 \times 10^{10}$ $\Omega \cdot$ cm.

The crystalline resin in the present invention is preferably a thermoplastic resin possessing crystallinity. Examples thereof include polyamide resin, polyethylene resin, polypropylene resin, polyethylene terephthalate resin, polybutylene terephthalate resin, polyphenylene sulfide resin and polyether ether ketone resin. Of these thermoplastic resins, polyamide resin, polyethylene terephthalate resin, polybutylene terephthalate resin and polyphenylene sulfide resin are preferred. These thermoplastic resins may be used singly or in combination of two or more kinds. In addition, there may be mentioned copolymers or mixtures comprising mainly of these polymers; thermoplastic resins prepared by formulating an elastomer such as rubber or rubber-like resin therein; and polymer alloys containing not less than 10% by weight of these thermoplastic resins.

Examples of such polyamide resins include nylon 6, nylon 66, nylon 46, nylon 11, nylon 12, nylon 69, nylon 610, nylon 612, nylon 96, amorphous nylon, nylon RIM, nylon MIX 6, and copolymers of two or more thereof, such as nylon 6/66 copolymer, nylon 6/66/610 copolymer, nylon 6/66/11/12 copolymer and crystalline nylon/amorphous nylon copolymer. Also, the polyamide resin for the present invention may be an alloy of a polyamide resin and another synthetic resin. Examples of such alloys include polyamide/polyester alloy, polyamide/polyphenylene oxide alloy, polyamide/polycarbonate alloy, polyamide/polyolefin alloy, polyamide/styrene/acrylonitrile alloy, polyamide/acrylate alloy and polyamide/silicone alloy. These polyamide resins may be used singly or in combination of two or more species.

The polyethylene terephthalate resin in the present invention may be a polyester resin which is obtained from an aromatic dicarboxylic acid (mainly terephthalic acid) or an ester thereof and a glycol (mainly ethylene glycol) as the major starting materials, and which contains in its molecular structure a large number of ethylene terephthalate repeat units. Suited for the present invention is ethylene terephthalate resin having at least 60 mol % of ethylene terephthalate repeat units, preferably polyethylene terephthalate resin having not less than 80 mol %, more preferably not less than 90 mol % of ethylene terephthalate repeat units. The polyethylene terephthalate resin in the present invention may contain aromatic dicarboxylic acids other than terephthalic acid, such as isophthalic acid, phthalic acid, 2,6-naphthalenedicarboxylic acid, 1,4-naphthalenedicarboxylic acid, adipic acid, sebacic acid, 4,4'-diphenyletherdicarboxylic acid, cyclohexanedicarboxylic acid and oxycarboxylic acids (e.g., p-hydroxybenzoic acid, p-hydroxyethoxybenzoic acid), as copolymer components, and may also contain glycols other than ethylene glycol, such as diethylene glycol, propylene glycol, 1,4-butanediol, 1,3-propanediol, 1,4-cyclohexanedimethanol, polyalkylene oxide and neopentylglycol, as copolymer components.

In addition, the polyethylene terephthalate resin in the present invention may be a polymer alloy of a polyethylene terephthalate that may contain the aforementioned aromatic dicarboxylic acids other than terephthalic acid and/or glycols other than ethylene glycol as copolymer components, and another synthetic resin. Examples of such polymer alloys include polyethylene terephthalate/polycarbonate alloy, polyethylene terephthalate/polyamide alloy, polyethylene terephthalate/ABS alloy, polyethylene terephthalate/polypropylene alloy, polyethylene terephthalate/polyphenylene ether alloy and polyethylene terephthalate/polybutylene terephthalate alloy.

The polybutylene terephthalate resin in the present invention may be a polyester resin which is obtained from an aromatic dicarboxylic acid (mainly terephthalic acid) or an ester thereof and a glycol (mainly 1,4-butanediol) as the major starting materials, and which contains in its molecular structure a large number of butylene terephthalate repeat units. Suited for the present invention is polybutylene terephthalate resin having at least 60 mol % of butylene terephthalate repeat units, preferably polybutylene terephthalate resin having not less than 80 mol %, more preferably not less than 90 mol % of butylene terephthalate repeat units. The polybutylene terephthalate resin in the present invention may be a polymer alloy of polybutylene terephthalate resin and another synthetic resin. Examples of such polymer alloys include polybutylene terephthalate/polycarbonate alloy, polybutylene terephthalate/polyamide alloy, polybutylene terephthalate/ABS (acrylonitrile-butadiene-styrene copolymer resin) alloy, polybutylene terephthalate/polypropylene alloy and polybutylene terephthalate/polyphenylene ether alloy. These polybutylene terephthalate resins (including polymer alloys) may be used singly or in combination of two or more species.

The amount of nigrosine compound used in the crystalline resin in the present invention may, for example, be 0.01 to 15% by weight relative to the crystalline resin in the case of ordinary resin coloring (low-color-density molded products (including the use of master batch)). This content is preferably 0.1 to 10% by weight, and for the improvement of the surface gloss of the crystalline resin molded product and improvement of the fluidity of the crystalline resin, it is more preferably 0.5 to 5% by weight. For the purpose of lowering the crystallization temperature of a crystalline resin or improving the fluidity of a crystalline resin, the amount of nigrosine compound added may be 0.3 to 2% by weight relative to the crystalline resin. In the case of master batches (high-color-density molded products), the amount of coloring agent used may be 20 to 60% by weight relative to the crystalline resin, and is preferably 20 to 40% by weight. In the present invention, the effect of the containment of the nigrosine compound of the present invention in a crystalline resin is greater in cases where a master batch comprising a crystalline resin and the nigrosine compound of the present invention contained at a high concentration therein is further mixed in the crystalline resin than in cases where the nigrosine compound of the present invention is contained directly in the crystalline resin.

The nigrosine compound of the present invention acts as a fluidity-improving agent, a surface gloss-improving agent and a crystallization temperature-lowering agent.

Of the other black coloring agents, aniline black is unsatisfactory in terms of appearance and surface gloss for use in sophisticated molded products, although it has good light fastness. In addition, aniline black is not readily dispersible in resins, necessitating painstaking procedures for its thorough dispersion. On the other hand, carbon black acts as a crystal-nucleating agent to raise the crystallization temperature of a resin composition and considerably deteriorates its appearance and surface gloss, although it is inexpensive and good in color fastness. Furthermore, because carbon black weakens the binding force within the crystalline resin, it can deteriorate the mechanical properties of the resin, and because carbon black is poorly dispersible in the resin, it is quite difficult to uniformly color the resin.

When the nigrosine compound of the present invention and aniline black and/or carbon black are used in mixture, however, the dispersibility of aniline black and carbon black in resins is improved by the effect of the nigrosine compound of the present invention, producing a resin composition with improved appearance and surface gloss. For this reason, even when an appropriately blended mixture of the nigrosine compound and aniline black and/or carbon black is used for coloring, a well practical colored crystalline resin composition is obtained.

The crystalline resin composition of the present invention may contain appropriate amounts of various fibrous reinforcing materials according to its use and purpose. Any fibrous reinforcing material can be used for the present invention, as long as it can be used to reinforce conventional synthetic resins. Examples of such fibrous reinforcing materials include glass fiber, carbon fiber and various organic fibers. In the case of glass fiber, for example, its content is preferably set at 5 to 120% by weight relative to 100% by weight of the crystalline resin. If the glass fiber content is under 5% by weight, satisfactory reinforcing effect is not easy to achieve with the glass fiber; if the glass fiber content exceeds 120% by weight, the moldability tends to reduce. The glass fiber content is preferably 10 to 60% by weight, particularly preferably 20 to 50% by weight.

The crystalline resin composition and fiber-reinforced crystalline resin molded product of the present invention may be formulated with various commonly known additives to confer the desired characteristic according to the objective. Examples of such additives include auxiliary colorants, dispersing agents, fillers, stabilizers, plasticizers, modifiers, ultraviolet absorbents or light stabilizers, antioxidants, antistatic agents, flame retardants and elastomers for improved impact resistance.

Auxiliary colorants include, for example, inorganic pigments, organic pigments or organic dyes used in small amounts to enhance the coloring power, to improve the heat resistance and light fastness, or to adjust the color tone.

Examples of modifiers include silicone compounds such as amino-modified silicone oil and alkyl-modified silicone oil, and waxes.

Examples of ultraviolet absorbents and light stabilizers include benzotriazole compounds, benzophenone compounds, salicylate compounds, cyanoacrylate compounds, benzoate compounds, oxalide compounds, hindered amine compounds and niccolates.

Examples of antioxidants include phenol compounds, phosphorus compounds, sulfur compounds and thioether compounds.

Examples of antibacterial/antifungal agents include 2-(4'-thiazolyl)-benzimidazole, 10, 10'-oxybisphenoxarsine, N-(fluorodichloromethylthio)phthalimide and bis(2-pyridylthio-1-oxide)zinc.

Examples of flame retardants include halogen-containing compounds such as tetrabromobisphenol A derivatives, hexabromodiphenyl ether and tetrabromophthalic anhydride; phosphorus-containing compounds such as triphenyl phosphate, triphenyl phosphite, red phosphorus and ammonium polyphosphate; nitrogen-containing compounds such as urea and guanidine; silicon-containing compounds such as silicone oil, organic silane and aluminum silicate; and antimony compounds such as antimony trioxide and antimony phosphate.

Examples of inorganic fillers include glass flake, glass beads, silica, quartz, amorphous silicic acid, talc, magnesium carbonate, calcium carbonate, alumina, metal powder, kaolin, calcium silicate, mica and wollastonite.

The crystalline resin composition of the present invention can be prepared by formulating the starting materials by an optionally chosen method of formulation. Normally, it is preferable to mix these components as uniformly as possible. For example, a crystalline resin composition can be prepared by uniformly mixing all starting materials in a mechanical mixer such as a blender, a kneader, a banbury mixer, a roll or an extruder. Alternatively, it can be obtained by mixing some starting materials in a mechanical mixer, and subsequently adding the remaining components and uniformly mixing them. It can also be obtained as colored grains (colored pellets) by kneading the starting materials, previously blended in a dry state, in a molten state using a heated extruder, to obtain a uniform mixture, extruding the mixture into a needle form, and subsequently cutting it into pieces of desired length.

In addition, a master batch of the crystalline resin composition of the present invention can be obtained by an optionally chosen method. For example, it can be obtained by mixing the crystalline resin as the master batch base, in a powder or pellet form, and coloring agents in a mechanical mixer such as a tumbler or a super mixer, pelletizing or coarsely granulating the mixture by the hot melt method using an extruder, a batch kneader, a roll kneader, or the like. A master batch can also be obtained by adding coloring agents to a crystalline resin for master batch remaining in a molten state after synthesis, then removing the solvent.

The crystalline resin composition of the present invention can be molded by various procedures in common use. For example, it can be molded from colored pellets using a molding machine such as an extruder, an injection molding machine or a roll mill. In addition, it can be molded by mixing in an appropriate mixer a crystalline resin, in a pellet or powder form, pulverized coloring agents, and various additives used as necessary, and molding this mixture using a molding machine. It is also possible to add a coloring agent to a monomer containing an appropriate polymerization catalyst, polymerize this mixture into a desired crystalline resin, and mold this resin by an appropriate method. Molding can be achieved by any molding methods in common use, including injection molding, extrusion molding, compression molding, foaming, blow molding, vacuum molding, injection blow molding, rotational molding, calendering and solution casting.

EXAMPLES

The present invention is hereinafter described in more detail by means of the following examples, which are not to be construed as limitative.

Production Examples 1 through 7 concern the production of the nigrosine compound of the present invention. Production Examples 8 and 9 concern the production of master batches using said nigrosine compound.

Production Example 1

In 1,000 g of a 10% aqueous solution of sulfuric acid, 60 g of Spirit Black AB (trade name for nigrosine produced by Orient Chemical Industries Ltd.) was dispersed. After being stirred at 80° C. for 6 hours, this dispersoid was collected by filtration, and the cake filtered out was washed with water and dried to yield 57.0 g (yield 95%) of a black compound.

Production Example 2

In the same manner as in Production Example 1, except that 1,000 g of a 10% aqueous solution of sulfuric acid was replaced with 1,000 g of a 10% aqueous solution of phosphoric acid, 55.2 g (yield 92%) of a black compound was obtained.

Production Example 3

In the same manner as in Production Example 1, except that 1,000 g of a 10% aqueous solution of sulfuric acid was replaced with 1,000 g of a 1% aqueous solution of sulfuric acid, 55.8 g (yield 93%) of a black compound was obtained.

Production Example 4

In the same manner as in Production Example 1, except that Spirit Black AB was replaced with Spirit Black SB (trade name for nigrosine produced by Orient Chemical Industries Ltd.), 54.5 g (yield 91%) of a black compound was obtained.

Production Example 5

In the same manner as in Production Example 1, except that Spirit Black AB was replaced with Nigrosine Base EX (trade name for nigrosine produced by Orient Chemical Industries Ltd.), 59.4 g (yield 99%) of a black compound was obtained.

Production Example 6

In the same manner as in Production Example 1, except that Spirit Black AB was replaced with Nigrosine Base SAP-L (trade name for nigrosine produced by Orient Chemical Industries Ltd.), 58.4 g (yield 97%) of a black compound was obtained.

Production Example 7

(a) Synthesis of Nigrosine

By charging 140 ml of aniline, 40 ml of nitrobenzene, 25 g of ferric chloride and 5.5 g of concentrated hydrochloric acid in a reactor, and carrying out a condensation reaction at 180° C. for 14 hours, 100 g of a condensate was obtained.

(b) Synthesis of Nigrosine Sulfate

In 1,000 g of a 10% aqueous solution of sulfuric acid, 100 g of the condensate (nigrosine) obtained above was dispersed. After being stirred at 80° C. for 6 hours, this dispersoid was collected by filtration, and the cake filtered out was washed with water and dried to yield 47 g (yield 94%) of a black compound.

The Fe, Cl, $SO_4^{2-}$, $PO_4^{3-}$ and aniline contents of the various black compounds obtained in Production Examples 1 through 7, Spirit Black AB (AB), Spirit Black SB (SB) and Nigrosine Base SAP-L (SAP-L) are shown in Table 1. For each sample, data were obtained as follows:

Fe: After 5 ml of nitric acid was added to a 50 mg sample, pressurized decomposition was conducted using microwaves. To this decomposed product, 0.1 N hydrochloric acid was added, to make a total volume of 50 ml. After a working curve was drawn using a reference sample of known concentration, the liquid obtained above was analyzed by atomic absorptiometry [analyzer: flame spectrophotometer AA-660 (produced by Shimadzu Corporation)].

Cl: To a 250 mg sample, accurately weighed, DMF (dimethylformamide) was added, to make a total volume of 25 ml, and the sample was dissolved by ultrasonication. After a working curve was drawn using a reference sample of known concentration, the liquid obtained above was analyzed for total chlorine [analyzer: TOX-10 Sigma (trade name, produced by Mitsubishi Chemical)].

$SO_4^{2-}$ and $PO_4^{2-}$: To a 200 mg sample, 5 ml of methanol was added; to the sample dispersion liquid obtained by ultrasonication, ion exchange water was added, to make a total volume of 50 ml. While refluxing, this dispersion liquid was boiled for 1 hour, and the liquid obtained was centrifuged, then filtered through a 25 µm membrane filter. After a working curve was drawn using a reference sample of known concentration, the filtrate obtained above was analyzed by ion chromatography [analyzer: DX-300 (produced by Dionex Corporation), column: Iou Pac AS12A].

Aniline contained: After a working curve for aniline was drawn, ethanol was added to a 0.15 g sample and a preset amount of internal standard p-chloroaniline to make a total volume of 20 ml, and these components were mutually dissolved by ultrasonication. The liquid obtained was analyzed by gas chromatography [analyzer: 5890 produced by Hewlett-Packard, column: DB-1 (30×0.53 mm×1.5 µm), oven heating conditions: from 100° C. to 280° C. at a rate of 20° C. /min, injection temperature: 280° C., detector temperature: 280° C., detector: FID].

TABLE 1

| Production Example | Fe (%) | Cl (%) | $SO_4^{2-}$ (%) | $PO_4^{3-}$ (%) | Aniline contained (%) |
|---|---|---|---|---|---|
| 1 | 0.40 | 0.77 | 5.06 | — | 0.35 |
| 2 | 0.31 | 2.62 | — | 0.78 | 0.32 |
| 3 | 0.47 | 1.85 | 3.63 | | |
| 4 | 0.23 | 0.89 | 0.08 | — | |
| 5 | 0.18 | 0.03 | 3.22 | | |
| 6 | 0.43 | 0.39 | 0.08 | | |
| 7 | 0.10 | 0.99 | 5.57 | | |
| AB | 0.73 | 4.33 | | | |
| SB | 0.96 | 5.56 | | | 3.21 |
| SAP-L | 1.04 | 1.55 | | | |

Production Example 8

Production of Master Batch (M/B)
Black compound of Production Example 1 . . . 125 g
6-Nylon (produced by Toray, trade name: AMILAN CM1017) . . . 375 g The above blend was placed in a stainless steel tumbler and stirred and mixed for 1 hour. This mixture was kneaded in a molten state using a twin-screw extruder (produced by Ikegai Corporation, trade name: PCM-30) to yield black pellets. These pellets were dried under reduced pressure at 120° C. for 1 day to yield a master batch of a coloring concentration of 25% by weight.

Production Example 9

Production of Master Batch (M/B)
Black compound of Production Example 1 . . . 98 g
Aniline black . . . 27 g
6-Nylon (produced by Toray, trade name: AMILAN CM1017) . . . 375 g The above blend was placed in a stainless steel tumbler and stirred and mixed for 1 hour. This mixture was kneaded in a molten state using a twin-screw extruder (produced by Ikegai Corporation, trade name: PCM-30) to yield black pellets. These pellets were dried under reduced pressure at 120° C. for 1 day to yield a master batch of a coloring concentration of 25% by weight.

Example 1

Production of Colored Pellets
Nylon 66 (produced by Du Pont, trade name: 101L-NC10) . . . 1000 g
Black compound of Production Example 1 . . . 10 g The above blend was placed in a stainless steel tumbler and stirred and mixed for 20 minutes. This mixture was kneaded in a molten state at 270° C. by an ordinary method using a vent type extruding machine (produced by Enpura Sangyo, trade name: E30SV) to yield uniformly colored pellets with good appearance and surface gloss (2 mmφ×2 mm), which were dried at 120° C., for 6 hours.

Figure 2:
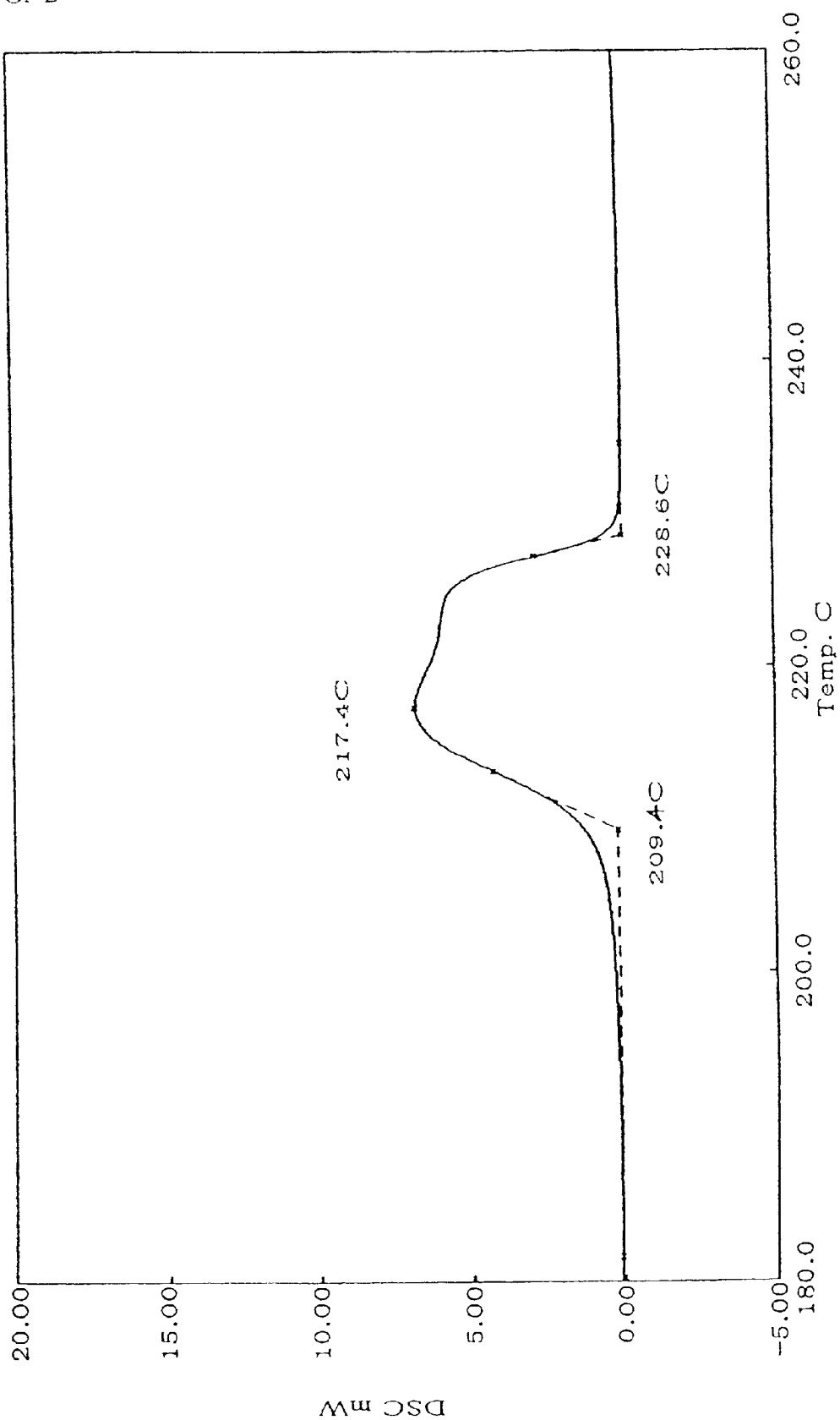
FIG. 2 shows a DSC curve for colored pellets.

In accordance with JISK7121, these pellets were cut as appropriate for the measuring cell of a differential scanning calorimeter (produced by Seiko Denshi Kogyo, trade name: DSC6100), evenly housed therein, and immobilized with a cover, after which their melting point and crystallization temperature were determined using the differential scanning calorimeter as described below. First, the temperature was raised from room temperature to 300° C. at a rate of 20° C./min, the peak melting temperature was determined, and the temperature was kept constant at 300° C. for 3 minutes, after which the cell was cooled to room temperature at a rate of 10° C./min, and the extrapolated crystallization initiation temperature (Tic), peak crystallization temperature and extrapolated crystallization temperature (Tec) were determined. The DSC curve obtained by this measurement is shown in FIG. 1. In FIG. 1, the abscissa indicates time (min), the left ordinate indicates DSCmW and the right ordinate indicates temperature (°C.). The DSC curve obtained by determining the extrapolated crystallization initiation temperature (Tic), peak crystallization temperature and extrapolated crystallization temperature (Tec) with the abscissa indicates temperature (°C.) and the ordinate indicating DSCmW is shown in FIG. 2.

Taking the peak melting temperature as melting point (Tpm), the peak crystallization temperature as crystallization temperature, and the crystallization temperature of the original resin containing no black compound (hereinafter referred to as "original resin" ) as $T°_{pc}$, the crystallization temperature difference $\Delta T_{pc}$ is expressed as the difference between the crystallization temperature $T°_{pc}$ and the crystallization temperature $T_{pc}$ of the colored resin composition, i.e., $\Delta T_{pc}=T_{pc}-T°_{pc}$.

As determined by DSC, the melting points, extrapolated crystallization initiation temperatures, crystallization temperatures and extrapolated crystallization completion temperatures, and crystallization temperature differences from the original resin are shown in Table 2.

Examples 2 through 4

In Examples 2 through 4, uniformly colored pellets (2 mmφ×2 mm) with good appearance, surface gloss and no color ununiformity were prepared in the same manner as in Example 1, except that the black compound of Production Example 1 was replaced with the black compounds of Production Example 2, Production Example 3 and Production Example 7, respectively, and subjected to differential thermal analysis. The results obtained are shown in Table 2.

Comparative Example 1

In Comparative Example 1, uniformly colored pellets (2 mmφ–2 mm) were obtained in the same manner as in Example 1, except that the black compound of Production Example 1 was replaced with Spirit Black AB (trade name for nigrosine produced by Orient Chemical Industries Ltd.), and subjected to differential thermal analysis. The results obtained are shown in Table 2.

Comparative Example 2

In Comparative Example 2, uniformly colored pellets (2 mmφ×2 mm) were prepared in the same manner as in Example 1, except that the black compound of Production Example 1 was replaced with Spirit Black SB (trade name for nigrosine produced by Orient Chemical Industries Ltd.), and subjected to differential thermal analysis. The results obtained are shown in Table 2.

Gloss Test and Evaluation

Regarding gloss, gloss values were measured at an incidence angle of 60 degrees with respect to the test piece, using a glossmeter [produced by Suga Test Instruments, trade name: HG-268].

Generally, higher gloss values are judged to indicate higher surface smoothness and greater surface gloss.

Evaluation of Spiral Flow Length

Using a spiral flow test metal mold [10×2.5×460 (mm)], the lengths of molded products were measured at a molding temperature of 280° C. and a mold temperature of 80° C. under constant molding conditions such as injection speed and injection pressure.

Generally, longer spiral flows are believed to indicate better fluidity, easier molding, higher surface smoothness, and greater suppression of the in floating phenomenon for reinforcing materials such as glass fiber in the case of fiber-reinforced crystalline resins such as glass fiber-reinforced nylon.

Determination and Evaluation of OD Values

The OD values of test pieces were determined using a transmission/reflection densitometer (produced by Macbeth, trade name: TR-927).

Generally, higher OD values are judged to indicate higher surface smoothness and greater surface gloss.

Crystallization Temperature Differences

Colored pellets (2 mmφ×2 mm) were prepared in the same manner as in Example 1, except that 70G33L above was

TABLE 2

|  | Production Example | Melting point | Initiation temperature | Crystallization temperature | Completion temperature | Crystallization temperature difference |
|---|---|---|---|---|---|---|
| Example 1 | 1 | 262.0 | 227.1 | 217.4 | 210.0 | 10.2 (227.6) |
| Example 2 | 2 | 262.6 | 227.1 | 217.5 | 211.0 | 11.3 (228.8) |
| Example 3 | 3 | 262.9 | 228.6 | 218.7 | 211.6 | 7.9 (226.6) |
| Example 4 | 7 | 263.8 | 228.4 | 216.2 | 209.7 | 12.2 (228.4) |
| Comparative Example 1 | AB | 263.4 | 226.2 | 221.1 | 215.4 | 7.2 (228.3) |
| Comparative Example 2 | SB | 261.6 | 226.1 | 221.4 | 216.1 | 7.1 (228.5) |

In Table 2, the unit of measure for temperature is °C.; figures in parentheses are the crystallization temperatures of original resins.

Example 5

Glass-reinforced nylon 66 (fiber-reinforced polyamide resin having a mixing ratio by weight of polyamide resin:glass fiber=67:33, produced by Du Pont, trade name: 70G33L) ... 100 g
Master batch of Production Example 8 ... 4 g The above blend was placed in a stainless steel tumbler and stirred and mixed for 20 minutes. This mixture was injection molded at 290° C. by an ordinary method using an injection molding machine (produced by Kawaguchi Tekko, trade name: KM-50C) to yield a uniformly black test piece with good appearance and surface gloss [49×79×3 (mm)] (concentration of black compound of Production Example 1: about 1% by weight).

The results of determination of the gloss, OD value, crystallization temperature differential and spiral flow length of this test piece are shown in Table 3.

used as the crystalline resin, and their melting points and crystallization temperatures were determined.

Example 6

In the same manner as in Example 5, except that the amount of the master batch of Production Example 8 was halved, a uniformly black test piece with good appearance and surface gloss [49×79×3 (mm)] was obtained.

The results of determination of the gloss, OD value, crystallization temperature difference and spiral flow length of this test piece are shown in Table 3.

Comparative Examples 3 and 4

In the same manner as in Production Example 8, 25% master batches of Spirit Black AB (trade name for nigrosine produced by Orient Chemical Industries Ltd.) were produced.

In Comparative Example 3, a black test piece [49×79×3 (mm)] was obtained in the same manner as in Example 5, except that the master batch of Production Example 8 was replaced with the master batch of Spirit Black AB.

In Comparative Example 4, a black test piece [49×79×3 (mm)] was obtained in the same manner as in Comparative Example 3, except that the amount of master batch was halved.

The results of determination of the gloss, OD value, crystallization temperature difference and spiral flow length of these test pieces are shown in Table 3.

Comparative Examples 5 and 6

In the same manner as in Production Example 8, 25% master batches of Nigrosine Base SA (trade name for nigrosine produced by Orient Chemical Industries Ltd.) were produced.

In Comparative Example 5, a black test piece [49×79×3 (mm)] was obtained in the same manner as in Example 5, except that the master batch of Production Example 8 was replaced with the master batch of Nigrosine Base SA.

In Comparative Example 6, a black test piece [49×79×3 (mm)] was obtained in the same manner as in Comparative Example 5, except that the amount of master batch was halved.

The results of determination of the gloss, OD value, crystallization temperature difference and spiral flow length of these test pieces are shown in Table 3.

Comparative Example 7

In the same manner as in Example 5, except that the master batch of Production Example 8 was not formulated, a colorless test piece [49×79×3 (mm)] was obtained.

The results of determination of the gloss, OD value, crystallization temperature difference and spiral flow length of this test piece are shown in Table 3.

Example 7

In the same manner as in Example 5, except that glass-reinforced nylon 66 (fiber-reinforced polyamide resin having a mixing ratio by weight of polyamide resin:glass fiber=67:33, produced by Du Pont, trade name: 70G33L) was replaced with glass-reinforced nylon 66 (fiber-reinforced polyamide resin having a mixing ratio by weight of polyamide resin:glass fiber=57:43, produced by Du Pont, trade name: 70G43L), a uniformly black test piece with good appearance and surface gloss [49×79×3 (mm)] was obtained.

The results of determination of the gloss, OD value, crystallization temperature difference and spiral flow length of this test piece are shown in Table 4.

Example 8

In the same manner as in Example 7, except that the amount of the master batch of Production Example 8 was halved, a uniformly black test piece with good appearance and surface gloss [49×79×3 (mm)] was obtained.

The results of determination of the gloss, OD value, crystallization temperature difference and spiral flow length of this test piece are shown in Table 4.

Comparative Examples 8 and 9

In Comparative Example 8, a black test piece [49×79×3 (mm)] was obtained in the same manner as in Example 7, except that the master batch of Production Example 8 was replaced with the master batch of Spirit Black AB used in Comparative Example 3.

In Comparative Example 9, a black test piece [49×79×3 (mm)] was obtained in the same manner as in Comparative Example 8, except that the amount of the master batch of Comparative Example 8 was halved.

The results of determination of the gloss, OD value, crystallization temperature difference and spiral flow length of these test pieces are shown in Table 4.

Comparative Examples 10 and 11

In Comparative Example 10, a black test piece [49×79×3 (mm)] was obtained in the same manner as in Example 7, except that the master batch of Production Example 8 was replaced with the master batch of Nigrosine Base SA used in Comparative Example 5.

In Comparative Example 11, a black test piece (49×79×3 (mm)] was obtained in the same manner as in Comparative Example 10, except that the amount of master batch was halved.

The results of determination of the gloss, OD value, crystallization temperature difference and spiral flow length of these test pieces are shown in Table 4.

Comparative Example 12

In the same manner as in Example 7, except that the master batch of Production Example 8 was not formulated, a colorless test piece [49×79×3 (mm)] was obtained.

The results of determination of the gloss, OD value, crystallization temperature difference and spiral flow length of this test piece are shown in Table 4 (and Table 5).

TABLE 3 evaluation of 33% fiber-reinforced resin, M/B Coloring agent

| | Example 5 | Example 6 | Comparative Example 3 | Comparative Example 4 | Comparative Example 5 | Comparative Example 6 | Comparative Example 7 |
|---|---|---|---|---|---|---|---|
| Kind of resin | 70G33L | 70G33L | 70G33L | 70G33L | 70G33L | 70G33L | 70G33L |
| Coloring agent | Production Example 8 | Production Example 8 | AB | AB | SA | SA | Original resin |
| Coloring concentration (%) | 1.0 | 0.5 | 1.0 | 0.5 | 1.0 | 0.5 | — |
| Gloss | 83.6 | 78.0 | 79.9 | 75.2 | 81.3 | 76.0 | 60.5 |
| OD value | 2.55 | 2.45 | 2.51 | 2.36 | 2.49 | 2.36 | — |
| Crystallization temperature difference (° C.) | 10.7 | 7.3 | 10.3 | 7.0 | 8.8 | 6.1 | 0 |
| Spiral flow length (mm) | 313 | 290 | 255 | — | 253 | 247 | 234 |
| Comparison with original resin (%) | 134 | 124 | 109 | — | 108 | 106 | 100 |

TABLE 4 evaluation of 43% fiber-reinforced resin, M/B coloring agent

|  | Example 7 | Example 8 | Comparative Example 8 | Comparative Example 9 | Comparative Example 10 | Comparative Example 11 | Comparative Example 12 |
|---|---|---|---|---|---|---|---|
| Kind of resin | 70G43L | 70G43L | 70G43L | 70G43L | 70G43L | 70G43L | 70G43L |
| Coloring agent | Production Example 8 | Production Example 8 | AB | AB | SA | SA | Original resin |
| Coloring concentration (%) | 1.0 | 0.5 | 1.0 | 0.5 | 1.0 | 0.5 | — |
| Gloss | 80.4 | 63.0 | 72.5 | 60.0 | 72.5 | 59.6 | 47.1 |
| OD value | 2.51 | 2.33 | 2.39 | 2.20 | 2.37 | 2.14 | — |
| Crystallization temperature difference (° C.) | 10.5 | 7.8 | 10.3 | 7.5 | 9.3 | 7.0 | 0 |
| Spiral flow length (mm) | 289 | 243 | 212 | — | 213 | 210 | 194 |
| Comparison with original resin (%) | 149 | 125 | 109 | — | 110 | 108 | 100 |

Example 9

Glass-reinforced Nylon 66 (fiber-reinforced polyamide resin having a mixing ratio by weight of polyamide resin:glass fiber=57:43, produced by Du Pont, trade name: 70G43L) . . . 100 g Black compound of Production Example 1 . . . 1.0 g The above blend was placed in a stainless steel tumbler and stirred and mixed for 20 minutes. This mixture was injection molded at 290° C. by an ordinary method using an injection molding machine (produced by Kawaguchi Tekko, trade name: KM-50C) to yield a uniformly black test piece with good appearance and surface gloss [49×79×3 (mm)].

The results of determination of the gloss, OD value, crystallization temperature difference and spiral flow length of this test piece are shown in Table 5.

Examples 10 through 15 and Comparative Example 13

In the same manner as in Example 9, except that the content ratio of coloring agents (nigrosine compound, carbon black, aniline black) was changed as shown in Table 5, black test pieces [49×79×3 (mm)] were obtained.

TABLE 5 evaluation of 43% fiber-reinforced resin, powder mixing

|  | Example 9 | Example 10 | Example 11 | Example 12 | Example 13 | Example 14 | Example 15 | Comparative Example 12 | Comparative Example 13 |
|---|---|---|---|---|---|---|---|---|---|
| Kind of resin | 70G43L | 70G43L | 70G43L | 70G43L | 70G43L | 70G43L | 70G43L | 70G43L | 70G43L |
| Nigrosine Compound (g) | Production Example 1 | Production Example 1 | Production Example 1 | Production Example 1 | Production Example 1 | Production Example 5 | Production Example 7 | Original resin | 0 |
|  | 1.0 | 0.8 | 0.5 | 0.2 | 0.6 | 1.0 | 1.0 |  |  |
| Carbon black (g) | 0 | 0.2 | 0.5 | 0.8 | 0.1 | 0 | 0 | 0 | 1.0 |
| Aniline black (g) | 0 | 0 | 0 | 0 | 0.3 | 0 | 0 | 0 | 0 |
| Coloring concentration (%) | 1.0 | 1.0 | 1.0 | 1.0 | 1.0 | 1.0 | 1.0 | 0 | 1.0 |
| Gloss | 70.1 | 61.6 | 46.2 | 33.6 | 61.4 | — | — | 47.1 | 20.8 |
| OD value | 2.41 | 2.25 | 2.13 | 2.01 | 2.28 | 2.37 | 2.40 | — | 1.70 |
| Crystallization temperature difference (° C.) | 7.7 | 6.8 | 4.9 | 2.4 | 8.1 | 5.2 | 5.0 | 0 | −4.1 |
| Spiral flow length (mm) | 256 | 244 | 220 | 206 | 220 | 233 | 250 | 194 | 206 |
| Comparison with original resin (%) | 132 | 126 | 114 | 106 | 114 | 120 | 129 | 100 | 106 |

Example 16

Solvent Resistance Test of Molded Products

Using the black test piece of Example 7 (25% master batch of the nigrosine compound of Production Example 1 mixed at 4% by weight in glass-reinforced nylon 66) and the black test piece of Comparative Example 10 (25% master batch of Nigrosine Base SA mixed at 4% by weight in glass-reinforced nylon 66), a solvent resistance test was performed by the test method described below.

Test method: Each test piece was immersed in each solvent at 40° C. for 48 hours, after which the solvent was visually checked and analyzed for color difference using a color difference meter (produced by Color Techno System Corporation, trade name: JP7100F). The rating criteria are as follows:

No elution: ○
Slight elution: Δ
Elution: ×

TABLE 6

|  | Ethanol | | Xylene | | EGL | | MEK | | Ethyl acetate | |
| --- | --- | --- | --- | --- | --- | --- | --- | --- | --- | --- |
|  | Visual check | Color difference | Visual check | Color difference | Visual check | Color difference | Visual check | Color difference | Visual check | Color difference |
| Production Example 1 | Δ | 0.61 | ○ | 0.20 | ○ | 0.12 | ○ | 0.08 | ○ | 0.20 |
| Nigrosine Base SA | X | 2.49 | ○ | 0.22 | Δ | 0.51 | ○ | 0.08 | ○ | 0.27 |

[In Table 6, EGL: ethylene glycol, MEK: methyl ethyl ketone]

Example 17

Determination of Volume Resistivities

The volume resistivity values of Production Example 1, Production Example 4, Production Example 6, Spirit Black SB, Spirit Black AB and Nigrosine Base SAP-L were determined.

Measuring conditions: A 1-gram sample was accurately weighed, placed between copper electrodes (lids) in a resistivity determination cell (cylindrical cell 18 mm in diameter), and pressurized between the two electrodes under a pressure of 2 kgf. While this pressure was continued to be exerted, a voltage of 500 V was exerted on the electrodes (sample-sandwiched electrodes) in the resistivity determination cell. After 1 minute, volume resistivity was determined using a resistivity value analyzer (produced by ADVANTEST, trade name: R8340A). In taking measurements, the distance between the electrodes (sample thickness) was input in the resistivity analyzer.

TABLE 7

|  | Production Example 1 | Production Example 4 | Production Example 6 | SB | AB | SAP-L |
| --- | --- | --- | --- | --- | --- | --- |
| Volume resistivity value | 32.25 | 27.36 | 35.70 | 8.42 | 10.65 | 12.26 |

Unit of measure: $10^9 \Omega \cdot cm$

What is claimed is:

1. Water-insoluble nigrosine compound which is a salt of nigrosine with sulfuric acid and/or phosphoric acid, said nigrosine salt being produced by treating a nigrosine, which a hydrochloride, with sulfuric acid and/or phosphoric acid.

2. Nigrosine compound of claim 1 wherein the chlorine concentration is not more than 3% by weight.

3. Nigrosine compound of claim 1 wherein the iron concentration is not more than 0.5% by weight.

4. Nigrosine compound of claim 1 wherein the residual aniline concentration is not more than 0.5% by weight.

5. Nigrosine compound of claim 1 wherein the volume resistivity value is not less than $2.0 \times 10^{10}$ Ω·cm.

6. Nigrosine compound of claim 2 wherein the iron concentration is not more than 0.5% by weight.

7. Nigrosine compound of claim 1 wherein said treatment with sulfuric acid and/or phosphoric acid is such that the chlorine ion constituting the salt in nigrosine is exchanged with a sulfate ion and/or phosphate ion.

8. Nigrosine compound of claim 1 which is a sulfate of nigrosine wherein the chlorine concentration is not more than 9000 ppm.

9. Crystalline resin composition comprising a crystalline resin and a water-insoluble nigrosine compound of claim 1 contained therein.

10. Crystalline resin composition of claim 9 wherein the crystalline resin is polyamide resin, polyethylene terephthalate resin, polybutylene terephthalate resin or polyphenylene sulfide resin.

11. Crystalline resin composition of claim 9 wherein the crystallization temperature is lower by not less than 7° C. than that of the original thermoplastic resin containing no nigrosine compound.

12. Crystalline resin composition of claim 9 wherein a fibrous reinforcing material is contained therein.

13. Crystalline resin composition of claim 12 wherein the fluidity is higher than that of the crystalline resin composition with nigrosine as a substitute for the nigrosine compound contained therein.

14. Crystalline resin composition of claim 9 wherein aniline black is contained therein.

15. Crystalline resin composition of claim 9 wherein carbon black is contained therein.

16. Fiber-reinforced crystalline resin molded product comprising a crystalline resin and a fibrous reinforcing material and a water-insoluble nigrosine compound both contained therein, wherein the surface gloss is higher than that of the fiber-reinforced crystalline resin molded product with nigrosine as a substitute for said nigrosine compound, said water-insoluble nigrosine compound being a salt of nigrosine with sulfuric acid and/or phosphoric acid.

17. Method for lowering the crystallization temperature of a crystalline resin wherein the crystallization temperature of said crystalline resin is lowered by not less than 7° C. than that of the original crystalline resin containing no nigrosine compound by incorporating a water-insoluble nigrosine in the crystalline resin, said water-insoluble nigrosine compound being a salt of nigrosine with sulfuric acid and/or phosphoric acid.

18. Method for improving the fluidity of a crystalline resin wherein the fluidity of the crystalline resin is improved in comparison with that of the original crystalline resin containing no nigrosine compound by incorporating a water-insoluble nigrosine in the crystalline resin, said water-insoluble nigrosine compound being a salt of nigrosine with sulfuric acid and/or phosphoric acid.

19. Method of claim 18 for improving the fluidity of a crystalline resin wherein a fibrous reinforcing material is contained in the crystalline resin.

20. Method for improving the surface gloss of a crystalline resin wherein the surface gloss of the crystalline resin is improved in comparison with that of the original crystalline resin containing no nigrosine compound by incorporating a water-insoluble nigrosine in the crystalline resin, said water-insoluble nigrosine compound being a salt of nigrosine with sulfuric acid and/or phosphoric acid.

21. Method of claim 20 for improving the surface gloss of a crystalline resin wherein a fibrous reinforcing material is contained in the crystalline resin.

22. Water-insoluble nigrosine compound which is a salt of nigrosine with at least one of sulfuric acid and phosphoric acid and which is produced by correspondingly treating said nigrosine with at least one of sulfuric acid and phosphoric acid, said nigrosine being prepared by oxidizing and dehydrate-condensing aniline, aniline hydrochloride and nitrobenzene in the presence of iron chloride at a reaction temperature of 160–180° C.

23. Nigrosine compound of claim 22 having a chlorine concentration of at most 3% by weight.

24. Nigrosine compound of claim 22 having an iron concentration of at most 0.5% by weight.

25. Nigrosine compound of claim 22 having a residual aniline concentration of at most 0.5% by weight.

26. Nigrosine compound of claim 22 having a volume resistivity of at least $2.0 \times 10^{10}$ Ω·cm.

27. Nigrosine compound of claim 22 which is a sulfate of nigrosine and which is produced by treating said nigrosine with d sulfuric acid.

28. Nigrosine compound of claim 22 which is a phosphate of nigrosine and which is produced by treating said nigrosine with phosphoric acid.

29. Nigrosine compound of claim 22 wherein said nigrosine is a hydrochloride and the hydrochloride is treated with at least one of sulfuric acid and phosphoric acid such that the chlorine ion constituting the salt moiety in nigrosine is correspondingly exchanged with at least one of a sulfate ion and a phosphate ion.

30. Nigrosine compound of claim 27 having a chlorine concentration of at most 9000 ppm.

31. Crystalline resin composition comprising a crystalline resin and a water-insoluble nigrosine compound of claim 22.

32. Composition of claim 31 wherein the crystalline resin is at least one of polyamide resin, polyethylene terephthalate resin, polybutylene terephthalate resin and polyphenylene sulfide resin.

33. Composition of claim 31 further including at least one of aniline black and carbon black.

34. Composition of claim 31 wherein the crystalline resin is a thermoplastic resin and the composition has a crystalline temperature which is at least 7° C. lower than that of the original thermoplastic resin which does not contain the water-insoluble nigrosine compound.

35. Composition of claim 31 further including a fibrous reinforcing material.

36. Composition of claim 35 having a higher fluidity than that of a corresponding crystalline resin composition in which said nigrosine is substituted for the water-insoluble nigrosine compound.

37. Fiber-reinforced crystalline resin molded product comprising the composition of claim 35 and having a higher surface gloss than that of a corresponding fiber-reinforced crystalline resin molded product in which said nigrosine is substituted for the water-insoluble nigrosine compound.

38. Method of lowering the crystallization temperature of a crystalline thermoplastic resin, which comprises incorporating a water-insoluble nigrosine compound of claim 22 into the crystalline thermoplastic resin sufficiently to provide the thermoplastic resin with a crystallization temperature which is at least 7° C. lower than that of the original thermoplastic resin which does not contain the water-insoluble nigrosine compound.

39. Method of improving the fluidity of a crystalline thermoplastic resin, which comprises incorporating a water-insoluble nigrosine compound of claim 22 into the crystalline thermoplastic resin sufficiently to provide the thermoplastic resin with a higher fluidity than that of a corresponding crystalline thermoplastic resin in which said nigrosine is substituted for the water-insoluble nigrosine compound.

40. Method of claim 39 wherein the thermoplastic resin includes a fibrous reinforcing material.

41. Method of improving the surface gloss of a crystalline thermoplastic resin, which comprises incorporating a water-insoluble nigrosine compound of claim 22 into the crystalline thermoplastic resin sufficiently to provide the thermoplastic resin with a higher surface gloss in comparison with that of the original thermoplastic resin which does not contain the water-insoluble nigrosine compound.

42. Crystalline resin composition comprising a crystalline resin and a water-insoluble nigrosine compound of claim 2 contained therein.

43. Crystalline resin composition comprising a crystalline resin and a water-insoluble nigrosine compound of claim 3 contained therein.

44. Crystalline resin composition comprising a crystalline resin and a water-insoluble nigrosine compound of claim 4 contained therein.

45. Crystalline resin composition comprising a crystalline resin and a water-insoluble nigrosine compound of claim 5 contained therein.

46. Crystalline resin composition comprising a crystalline resin and a water-insoluble nigrosine compound of claim 6 contained therein.

* * * * *